May 7, 1946.　　　F. W. BAUMANN　　　2,399,905
INDUCTION FREQUENCY CHANGER
Filed May 10, 1944
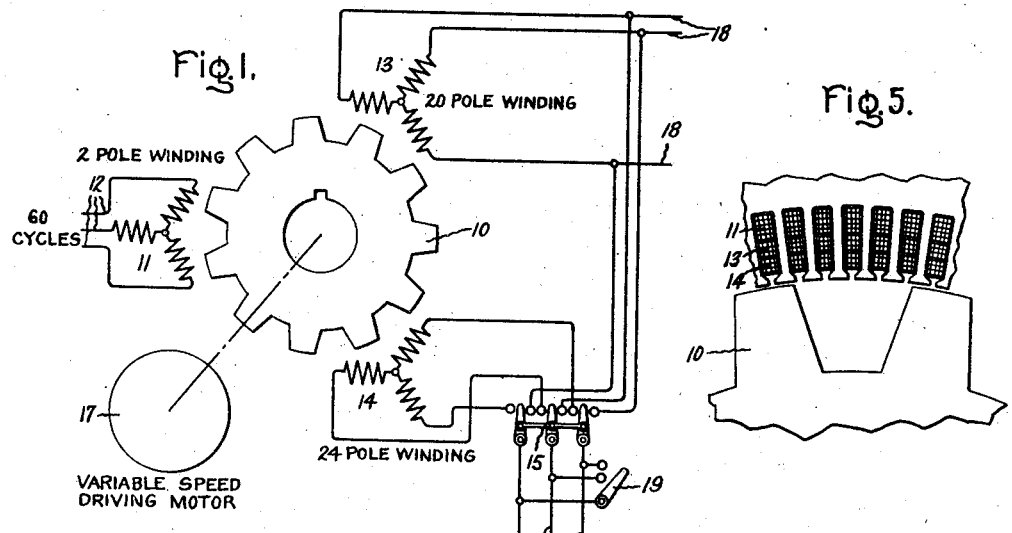
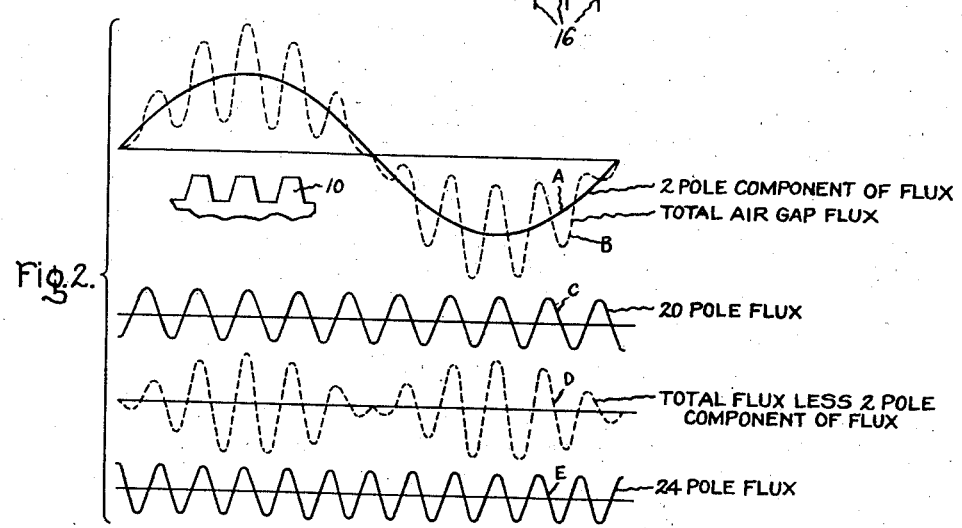
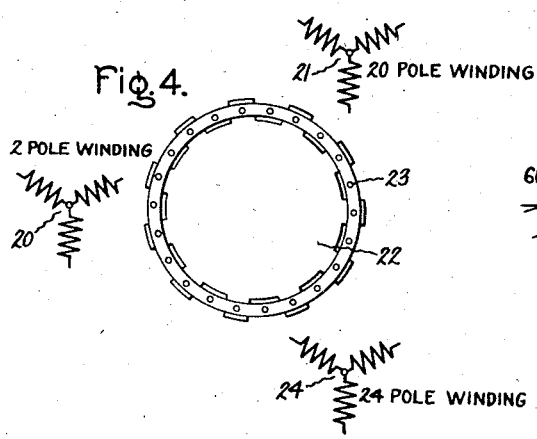
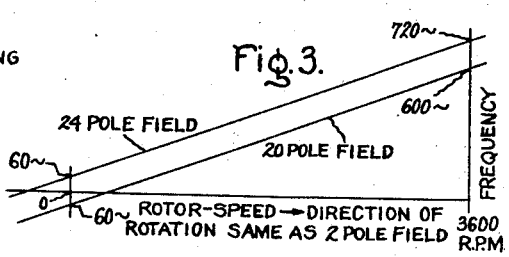
Inventor:
Frederick W. Baumann,
by Harry E. Dunham
His Attorney.

Patented May 7, 1946

2,399,905

UNITED STATES PATENT OFFICE 2,399,905

INDUCTION FREQUENCY CHANGER

Frederick W. Baumann, Scotia, N. Y., assignor to General Electric Company, a corporation of New York Application May 10, 1944, Serial No. 535,007

5 Claims. (Cl. 172—281)

My invention relates to frequency changers of the induction type and in particular to a machine of the class described, in which the output frequency may be varied and in which two output frequencies may be supplied at the same time. The invention is applicable to self- or separately driven frequency changers of any desired number of phases.

The features of my invention which are believed to be novel and patentable will be pointed out in the claims appended hereto. For a better understanding of my invention, reference is made in the following description to the accompanying drawing in which Fig. 1 represents a separately driven frequency changer having two output windings and frequencies. Fig. 2 is a series of curves representing the different flux components existing in the frequency changer of Fig. 1. Fig. 3 represents curves showing the rotor speed and output frequency relations of the frequency changer of Fig. 1; Fig. 4 represents a self-driven frequency changer embodying my invention, and Fig. 5 represents a section of the machine like Fig. 1 illustrating the relation between stator and rotor teeth.

Referring to Fig. 1, 10 represents a toothed rotor of magnetic material without windings having eleven evenly distributed salient pole teeth, and constitutes the rotor member of my frequency changer. The stator member, which is of conventional alternating current dynamoelectric machine stator construction, has on it three regular, Y-connected, three-phase alternating current windings of different pole numbers which are noninductive with respect to each other. The winding 11 represents a 2-pole primary winding which is assumed to be energized at 60 cycles from a source 12. The winding 13 is a 20-pole output winding, and the winding 14 is a 24-pole output winding. For the pole number winding arrangement specified the stator may have 120 evenly spaced closed slots. A three-phase switch 15 is represented whereby either winding 13 or 14 may be connected to supply a three-phase circuit 16. Likewise, winding 13 may supply a circuit 18 while winding 14 supplies the circuit 16. Seventeen (17) represents a driving motor assumed to be of the variable speed type in order that the rotor 10 may be driven at different desired speeds.

In the frequency changer described where the rotor has eleven slots and eleven teeth, there will be a 22-pole reluctance variation in the air gap and the 2-pole primary excitation will beat with the 22-pole rotor reluctance variation to produce 20- and 24-pole fields in the stator. The flux wave components existing in the stator of the frequency changer by reason of the 2-pole alternating current excitation and the presence of the 11-pole rotor are represented in Fig. 2.

Curve A represents the 2-pole component of primary or input exciting flux component and which by reason of the presence of the 11-toothed rotor produces the total air gap flux represented by curve B. The variation in air gap flux or the total air gap flux less the 2-pole component thereof is represented by curve D. Thus curve D=A—B. The flux of curve D may be separated into a 20-pole flux, curve C, and a 24-pole flux, curve E, both being perfectly uniform as to spacing between plus and minus values and as to magnitude and wave form. That is, D=C+E. The flux pattern represented in Fig. 3 is drawn for the condition existing when a rotor tooth is in alignment with the maximum of the 2-pole flux as indicated by the position of teeth of the section of rotor 11 represented below curve A. Other patterns of wave D will be obtained for other tooth positions relative to the fundamental flux wave A, but such other patterns may also be resolved into the 20- and 24-pole flux waves C and E.

That this is the case may be established mathematically as follows: The 2-pole excitation produces a revolving $mmf.$ which, for 60-cycle excitation, rotates at 3600 R. P. M. and is of the mathematical form $mmf.=K \sin(\omega t - x)$, where K is a constant, $\omega$ is speed of 2-pole field in radians per second, and $x$ is distance in radians.

The total permeance P of the air gap can be expressed by a Fourier series, the first two terms being: $P = P_0 + P_1 \sin(11\omega_2 t - 11x)$, where $P_0$=constant term in permeance expression, $P_1$=constant for the first harmonic in permeance, $t$ is time, and $\omega_2$ speed of rotor in radians per second. The flux density $B = mmf. \times P$, so that the flux density from the previous equations can be expressed as a sine function plus the product of two sinusoidal functions, thus:

$$B = P_0 K \sin(\omega t - x) + K P_1 \sin(\omega t - x) \sin(11\omega_2 t - 11x)$$

This equation can be written:

$$B = P_0 K \sin(\omega t - x) + \frac{KP_1}{2} \cos[(11\omega_2 - \omega)t - 10x] -$$

$$\frac{KP_1}{2} \cos[(\omega + 11\omega_2)t - 12x]$$

These terms will be recognized as:

(a) A 2-pole field rotating at a speed $\omega$, curve A, Fig. 2.

(b) A 20-pole field rotating at a speed of $$\frac{(11\omega_2 - \omega)}{10}$$

curve C, Fig. 2.

(c) A 24-pole field rotating at a speed of $$\frac{(11\omega_2 + \omega)}{12}$$

curve E, Fig. 2.

The speed and direction of rotation of the 20- and 24-pole fields depend upon the relative speed and direction of rotation of the 2-pole field and the rotor. The speed and direction of rotation of the 2-pole field with 60-cycle excitation is constant at 3600 R. P. M. Then the relation of speeds of the 20- and 24-pole fields and rotor is as given in the following table where the designations "forward" and "backward" refer to directions as compared to the direction of rotation of the 2-pole field.

| 20-pole field | | 24-pole field | | Speed of rotor |
|---|---|---|---|---|
| Speed | Output frequency | Speed | Output frequency | |
| 720 R. P. M. backward. | 120~ | 0 | 0 | 327 R. P. M. backward. |
| 360 R. P. M. backward. | 60~ | 300 R. P. M. forward. | 60~ | 0. |
| 0 | 0 | 600 R. P. M. forward. | 120~ | 327 R. P. M. forward. |
| 2,000 R. P. M. forward. | 600~ | 3,600 R. P. M. forward. | 720~ | 3,600 R. P. M. forward. |
| 4,590 R. P. M. forward. | 765~ | 4,425 R. P. M. forward. | 885~ | 4,500 R. P. M. forward. |

In the above table the output frequencies of the two windings are also given and it is to be noted that the phase rotation of the 20-pole output winding reverses when the rotor passes from below to above 327 R. P. M. forward. Fig. 3 shows the output frequencies of the 20- and 24-pole windings at different speeds of the rotor.

It is noted that when the rotor 11 is at standstill, the windings 13 and 14 each produce 60-cycle energy and at this time the machine functions as a transformer but with the inductive coupling through the rotor. This is the only time that the output windings 13 and 14 could be connected in parallel with any practicable results, and only then if they had the same voltage and phase rotation. I have found that if the 24-pole winding 14 be short circuited by a switch such as shown at 19, Fig. 1, with the primary or input winding 11 normally excited, the machine will be self-driven and rotate backward at a speed slightly below 327 R. P. M., at which time energy may be taken from the 20-pole output winding 13 at a frequency correspondingly slightly below 120 cycles. Also, the machine will be self-driven in the forward direction by short circuiting winding 13 at a speed approaching 327 R. P. M. Such motoring action is essentially induction motor action except that here both the primary and secondary windings are on the same stationary member and there is inductive coupling between them only through the rotor which tends to rotate at a speed where such coupling becomes zero.

I am not aware that this kind of motoring action has ever before been obtained, and has the advantage that different motoring speeds could be obtained by inserting more or less resistance in the secondary winding without using slip rings, since both primary and secondary windings are stationary.

For obtaining output frequencies above 120 cycles per second with the machine of Fig. 1 and with 60-cycle primary excitation available, the rotor 10 is driven by any suitable type of driving motor 17 and which of course may also be used for the lower frequency outputs also. Either output winding 13 or 14 may be used alone, or both may supply different load circuits simultaneously, and as the speed is varied so is the output frequency varied as shown by Fig. 3. Another change in output frequency for a given load circuit can be had by shifting the load circuit 16, for example, from one winding 14 to the other winding 13 without varying the speed of motor 17.

It will, of course, be evident that this machine can be made for any number of phases on any of the windings. A 120-slot stator was specified for the machine because 120 is divisible by the pole numbers given in the example, which permits the use of regular standard windings, which is desirable. A reduction of the number of slots would be possible by using an irregular winding arrangement, or only one output winding.

Other pole number relations and rotor teeth can be used. For example, if I used four primary exciting poles with an 11-pole rotor, then the output windings would be wound for 18 and 26 poles. Likewise, the rotor could have 13 poles or teeth, in which case, with 2-pole primary excitation, the machine would have 24- and 28-pole output windings. It is, however, necessary that all the windings used, whether there be one or two output windings, be noninductive with respect to each other, to obtain unmixed secondary frequency output.

Depending upon the size and design, the efficiency of this type of converter ranges from 50 per cent to 90 per cent. A converter having an output rating of 1.5 kw. at 0.8 power factor should have a 4-horsepower driving motor.

The machine may be self-driven as an induction motor as represented in Fig. 4. The arrangement is similar to Fig. 1 with the addition of a squirrel cage winding to the rotor. The rotor 22 has 11 evenly spaced salient poles producing 22 reluctance poles and is provided with a squirrel cage winding 23 to bring it up to speed. With 60-cycle primary excitation the machine will start as an induction motor and run at approximately 3600 R. P. M. as an induction motor, at which time approximately 720-cycle output is obtained from winding 24 and approximately 600 cycle output is obtained from winding 21. The windings 20, 21 and 24 are noninductive.

It is seen that we may use the pole number relation formula: $2N \pm Pn = Sn$, where $N$ = the number of evenly spaced salient pole rotor teeth, $Pn$ = primary pole number, and $Sn$ = secondary pole number or numbers.

What I claim as new and desire to secure by Letters Patent of the United States is:

1. A frequency converter comprising stator and rotor members, the rotor comprising a magnetic core having N number of evenly spaced salient pole teeth, the stator member having an alternating current primary exciting winding which when excited produces a rotating magnetic field of Pn poles constituting the entire excitation of the machine, which field beats with the reluctance variation caused by the rotor teeth to produce a pair of additional rotating magnetic fields in the stator of different pole numbers one having 2N+Pn poles and the other having 2N−Pn poles and both of such fields having a pole number higher than the pole number of the primary winding, and a secondary output winding on the stator having a pole number corresponding to one of such higher pole number fields, said two stator windings being noninductive with respect to each other.

2. A frequency converter comprising stator and rotor members, the rotor having N salient pole evenly spaced teeth, the stator member having an alternating current exciting winding which when excited produces a Pn pole rotating magnetic field constituting the entire excitation of the machine, and a pair of secondary output windings on the stator one having $2N+Pn$ poles and the other having $2N-Pn$ poles, all of said secondary windings being noninductive with respect to each other.

3. A frequency converter comprising stator and rotor members, the rotor having N evenly spaced salient pole teeth, an alternating current primary exciting winding on the stator for producing a $Pn$ pole rotating magnetic field constituting the entire excitation of the machine, which field beats with the reluctance variation caused by the rotor teeth to produce rotating magnetic fields in the stator of $2N+Pn$ poles and $2N-Pn$ poles, a pair of stator secondary windings having pole numbers corresponding to said last-mentioned pole numbers, all of said windings being noninductive with respect to each other, and means for driving the rotor of said machine at different desired speeds.

4. A frequency converter comprising stator and rotor members, said rotor having N evenly spaced salient pole teeth, the stator member having a primary exciting winding of $Pn$ poles, a secondary output winding of $2N+Pn$ poles and a secondary output winding of $2N-Pn$ poles, all of said windings being noninductive with respect to each other, and means for short circuiting one of said secondary windings to cause the machine to operate as an induction motor when the primary winding is energized and generating alternating current in the other secondary winding.

5. A frequency converter comprising stator and rotor members, the rotor comprising a magnetic core having N evenly spaced salient pole magnetic teeth, the stator member having a $Pn$ pole primary exciting winding, a $2N+Pn$ pole secondary output winding and a $2N-Pn$ pole secondary output winding, all of said windings being noninductive with respect to each other, and a squirrel-cage winding on the rotor to drive said machine as an induction motor when the primary winding is energized.

FREDERICK W. BAUMANN.